(12) United States Patent
McCormick et al.

(10) Patent No.: US 11,906,950 B1
(45) Date of Patent: Feb. 20, 2024

(54) SYSTEM AND METHODS FOR MAINTAINING AND UPDATING AN INDUSTRIAL ENTERPRISE DATA MODEL

(71) Applicant: Element Analytics, Inc., San Francisco, CA (US)

(72) Inventors: Sean McCormick, San Francisco, CA (US); James Bane, San Francisco, CA (US); Nicholas Childers, San Francisco, CA (US); Brian Thompson, San Francisco, CA (US)

(73) Assignee: Element Analytics, Inc., Oakland, CA (US)

( * ) Notice: Subject to any disclaimer, the term of this patent is extended or adjusted under 35 U.S.C. 154(b) by 194 days.

(21) Appl. No.: 17/221,719

(22) Filed: Apr. 2, 2021

Related U.S. Application Data

(60) Provisional application No. 63/004,367, filed on Apr. 2, 2020.

(51) Int. Cl.
*G06F 16/90* (2019.01)
*G05B 19/418* (2006.01)
*G06F 16/901* (2019.01)
*G05B 19/40* (2006.01)

(52) U.S. Cl.
CPC ... *G05B 19/41885* (2013.01); *G05B 19/4183* (2013.01); *G05B 19/41865* (2013.01); *G06F 16/9024* (2019.01)

(58) Field of Classification Search
CPC .................................................. G06F 16/9024
See application file for complete search history.

(56) References Cited

U.S. PATENT DOCUMENTS

2018/0285494 A1 * 10/2018 Taylor .................. G06Q 10/067
2022/0300502 A1 *  9/2022 Enver .................. G06F 16/2465

* cited by examiner

*Primary Examiner* — Kristopher Andersen
(74) *Attorney, Agent, or Firm* — Goodwin Procter LLP

(57) ABSTRACT

A system for managing industrial enterprise (IE) data models may include a storage device storing instructions and IE data models. Each of the IE data models may include references to artifacts and a directed graph having nodes and edges. Each of the nodes may represent a respective one of the artifacts. Each of the edges may indicate a relationship between a respective pair of the artifacts. The system may also include a processing device operable to execute the instructions to perform operations including managing dataflow through a particular one of the data models, wherein the edges of the directed graph of the particular data model define a direction of propagation of data through the artifacts of the particular data model, and providing version control functionality for the plurality of data models and for the artifacts referenced by any of the plurality of data models.

18 Claims, 5 Drawing Sheets

SYSTEM AND METHODS FOR MAINTAINING AND UPDATING AN INDUSTRIAL ENTERPRISE DATA MODEL

CROSS REFERENCE TO RELATED APPLICATION(S)

This application claims priority to and the benefit of U.S. Provisional Patent Application Ser. No. 63/004,367, titled "System and Methods for Updating an Enterprise Data Model" filed on Apr. 2, 2020, which is hereby incorporated by reference herein in its entirety.

FIELD OF TECHNOLOGY

The present disclosure relates generally to systems and methods for maintaining and updating an industrial enterprise data model.

BACKGROUND

Over the last several decades, as industries transitioned from analog and pneumatic controls to digitalized programmable logic controllers (PLCs), distributed control systems (DCSs), and supervisory control and data acquisition (SCADA) systems, operational technologies (OT) have provided plant personnel with ever increasing volumes of data to monitor, optimize, and control industrial processes; however, there has not been a clear path for organizations to leverage this data outside of OT domains. Differences in information technology (IT) and OT functions, technology stacks, and cultures have created significant barriers to OT-IT convergence.

With industrial systems (e.g., assets such as wind turbines, oil rigs, medical equipment, locomotives, etc.), identifying how and where to improve operations can be extraordinarily challenging. In many cases, the asset data that hold the answers are scattered among different production sites and incompatible systems, formats and processes. Basic systems (e.g., data lakes) have been developed to collect, analyze, visualize and share time-series asset data generated from multiple sources to people and systems across all operations. However, using a data lake to consolidate asset data does not solve the problem because without suitable context the operational signals in the data that feed modern analytics applications are generally very difficult to find without significant manual effort from highly paid experts. Creating that context is time consuming and expensive because of the naming, structural and semantic complexities of the data, especially industrial asset data (e.g., sensor data).

With prior systems, deploying an Asset Performance Manager (APM) or other similar application at a single production site could require five engineers working for six months (30-person months!) using a spreadsheet to integrate and model the asset data to feed the application. In one case, this process resulted in a 40,000 row by 26,000 column spreadsheet of metadata from 100+ sources and systems, including 17,000 process information tags or "PI tags" (e.g., unique identifiers for time-series data sets provided by industrial assets and managed by OSIsoft's PI Historian application). Once the spreadsheet was deployed, it was nearly impossible to keep the spreadsheet up to date with an accurate, trusted view of ever-changing physical equipment and operating conditions; accordingly, changes to physical equipment and operating conditions routinely blew up the APM application, leading to erroneous data analysis and lack of trust in the data models.

SUMMARY

Systems and methods for maintaining and updating an industrial enterprise data model are disclosed. According to one embodiment, a system for managing industrial enterprise data models may include one or more storage devices storing instructions and a plurality of industrial enterprise data models, wherein each of the industrial enterprise data models comprises a plurality of references to a respective plurality of artifacts and a directed graph having a plurality of nodes and a plurality of edges, each of the nodes representing a respective one of the artifacts, each of the edges indicating a relationship between a respective pair of the artifacts; and one or more processing devices operable to execute the instructions to perform operations. The operations may include managing dataflow through a particular one of the data models, wherein the edges of the directed graph of the particular data model define a direction of propagation of data through the artifacts of the particular data model; and providing version control functionality for the plurality of data models and for the artifacts referenced by any of the plurality of data models.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
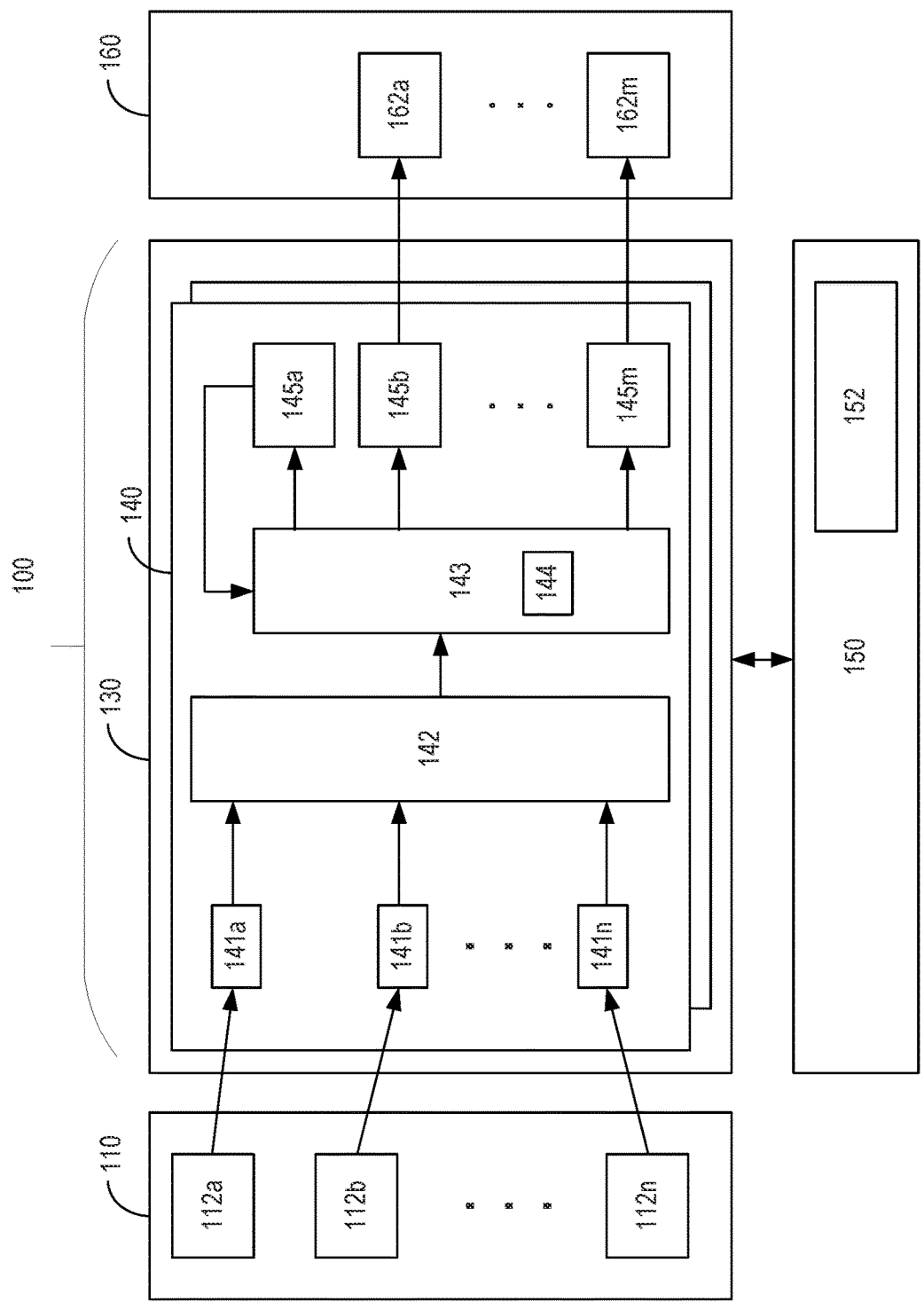
FIG. 1 is a block diagram of a data modeling system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for maintaining and updating an industrial enterprise data model are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for and Benefits of Some Embodiments

Industrial assets (e.g., pumps) generally provide time-series streams of operational data in which each packet of data has a timestamp and a measurement of an operational parameter (e.g., flow rate, differential pressure, etc.) of the asset at the time indicated by the timestamp. Despite the abundance of readily-available operational data, adoption of modern digital technologies (e.g., cloud computing, artificial intelligence (AI), machine learning (ML), etc.) in asset-intensive industries has been slow relative to the adoption of such technologies in finance, healthcare, and other service-oriented industries.

Existing data modeling tools have not been widely adopted in asset-intensive industries for a variety of reasons. First, such tools generally fail to contextualize the operational data provided by assets with other relevant data, including design data (e.g., original equipment manufacturer (OEM) data for the assets (e.g., the asset's maximum flow rate, maximum differential pressure, etc.), data indicating an asset's functional location, etc.), maintenance data (e.g., date of last maintenance performed on the asset, date of the asset's last failure, duration of the asset's last failure, etc.), IT data, market data, etc. Second, building models of complex assets (e.g., manufacturing plants) with such tools generally requires enormous amounts of time and effort, and the resulting models tend to be so brittle that they easily break in response to routine changes in the asset's configuration or operating conditions. Third, such tools generally do not support the creation of hierarchical models because they generally do not allow users to explicitly model the relationships between assets.

There is a need for data modeling tools that overcome the shortcomings of existing approaches. The present disclosure describes some embodiments of a scalable, event-driven platform for integration and contextualization of industrial enterprise data and for development and deployment of industrial enterprise data models. With respect to integration, some embodiments facilitate integration of IT and OT systems across multiple plant sites (e.g., across the entire enterprise). In some embodiments, the platform uses a flexible agent architecture to connect to IT and OT data sources. In some embodiments, the platform provides data integration (e.g., blending of data from IT and OT sources through integrated extraction, transformation, and loading (ETL)) and/or application integration (e.g., through application programming interfaces (APIs)).

With respect to contextualization, some embodiments provide standardized models (e.g., templates) for common industrial assets (e.g., pumps, tanks, heat exchangers, compressors, etc.). These models contextualize the operational data provided by the underlying industrial asset by augmenting that operational data with other relevant data (e.g., design data, maintenance data, IT data, etc.). Some embodiments also permit users to develop new asset models by specifying relationships (e.g., functional relationships, hierarchical relationships, etc.) between and among other asset models. The relationships among a complex asset model's constituent asset models may be defined, for example, by specifying a graph that connects the constituent asset models and represents the flow of data and events through the constituent assets.

With respect to deployment, some embodiments provide governance controls for industrial enterprise models and data. For example, some embodiments track data lineage (e.g., from data source to data sink), synchronize data and models across systems, and/or provide version control for the asset models.

Some Embodiments of Industrial Enterprise Data Modeling Systems

FIG. 1 shows an industrial enterprise (IE) data modeling system (or "data hub") 100, according to some embodiments. The data modeling system 100 may include a model repository 130 and a modeling controller 150. The model repository 130 may contain (e.g., persistently store on a computer-readable storage medium) one or more IE data models 140. Each of the IE data models 140 may be configured to obtain data from one or more data sources 112a-n (collectively, data sources 110) and provide data to one or more data sinks 162a-m (collectively, data sinks 160). The controller 150 may manage the flow of data and events through the data models 140, and manage the operation of the data modeling system 100. Some embodiments of the components and functionality of the data modeling system 100 are described in further detail below. In some cases, IE data models 140 may be referred to herein as "artifacts" or "data chains."

The model repository 130 may contain one or more IE data models 140. Each data model 140 may represent one or more industrial assets. In the simplest case, a data model 140 may represent an individual industrial asset (e.g., a pump, tank, heat exchanger, compressor, etc.). In more complex cases, a data model 140 may represent a collection of two or more industrial assets and relationships between those assets. For example, a data model 140 may represent all the industrial assets in a particular facility, all the industrial assets used in a particular production line, etc. A data model 140 that represents two or more industrial assets and relationships between those assets may be referred to herein as a "complex" data model. A data model that represents an individual industrial asset may be referred to herein as a "simple" data model.

Internally, each data model 140 may contain (e.g., persistently store on a computer-readable medium) a directed graph. The nodes of the directed graph may contain references to artifacts, and the edges of the graph may represent relationships between the referenced artifacts. In some embodiments, the edges of the graph may define the direction and manner in which data and/or events propagate through the data model 140.

Data models 140 may contain references to any suitable types of artifacts including, without limitation, ingest agents 141, data pipelines 142, asset models 143, relational artifacts 144 representing relationships among the asset models 143, and egress agents 145.

A model's ingest agents 141a-n may connect (e.g., communicatively couple) the model 140 to one or more data sources 112a-n (collectively, data sources 110). Any suitable data source 112 may be coupled to a model 140 via an ingest agent 141. For example, the data sources 110 may include, without limitation, one or more sources of operational data (e.g., time-series operational data) relating to the operation of one or more industrial assets, design data, maintenance data, transactional data, static data, and/or IT data. In some examples, a source of operational data may be an OSIsoft Process Information (PI) Server, Connector, Interface, or Historian. In some embodiments, each ingest agent 141 is coupled to a corresponding data source 112 and is configured to translate data provided by the data source 112 (e.g., by an API of the data source) into a format suitable for processing by the data model 140 (e.g., by a data pipeline 142 of the data model 140).

A model's data pipeline 142 may perform any suitable data processing operations (e.g., data transformations) on the data provided by the ingest agents 141. In some embodiments, the asset models 143 may include contextualized data templates, and the data pipeline 142 may transform the data into the form specified by the contextualized data templates. In this way, the data pipeline 142 and the ingress agents 141 may link the attributes of an asset model's template to the locations in the data sources 110 where the corresponding data are stored. Additionally or alternatively, the data pipeline 142 may perform other suitable data processing operations to generate any other suitable data, whether or not specified by an asset model 143.

A complex data model 140 may include a relational artifact 144 in which the nodes of the directed graph contain references to asset models 143, and the edges of the graph represent relationships between the referenced asset models. In some embodiments, the edges of the graph may define the direction and manner in which data and/or events propagate between the asset models 143. Each of the asset models 143 may be, for example, a model of an individual asset (e.g., a contextualized data template for an individual asset) or a hierarchical model of multiple assets (e.g., another data model 140). In this way, relationships among assets (and hierarchies of relationships among assets) may be modeled.

In the case of a simple data model 140, the relational artifact 144 and asset models 143 reduces to a single node, i.e., a single asset model 143. In such cases, the simple data model 140 may integrate additional contextual data with the asset model 143, thereby generating an enhanced simple asset model 140. In this way, hierarchies of contextualization may be layered upon an underlying asset model.

A model's egress agents 145a-m may couple the model 140 to one or more data sinks 162a-m (collectively, data sinks 162). Any suitable data sink 162 may be coupled to a model 140 via an egress agent 145. For example, the data sinks 160 may include, without limitation, one or more artificial intelligence (AI) systems, machine learning (ML) systems, data lakes, business intelligence (BI) applications, sources of operational data (e.g., time-series operational data) relating to the operation of one or more industrial assets, design data, maintenance data, transactional data, static data, Internet-of-Things (IoT) platforms (e.g., Industrial Internet-of-Things (IIoT) platforms), and/or other applications, platforms, or analytics tools. In some embodiments, each egress agent 145 is coupled to a corresponding data sink 162 and is configured to translate data provided by the data model 140 into a format suitable for processing by the data sink 162 (e.g., by an API of the data sink). In some cases, an egress agent 145 may provide the model's output as an input to the model's data pipeline 142.

Still referring to FIG. 1, the controller 150 may manage the flow of data and events through the data models 140, and manage the operation of the data modeling system 100. In response to suitable user input, the controller 150 may present a visualization of the relationships among assets and data sources modeled by the data model 140. This visualization may be derived from the model's relational artifact(s) 144. In some embodiments, the controller manages the states of a model's artifacts in response to various events. In some embodiments, the controller provides a version control functionality for the data models 140 and/or for the artifacts contained in the data models. In some embodiments, the controller 150 may perform the functions of an "omniverse traffic cop" as described below. In some embodiments, the controller 150 may store data in and/or load data from a data catalog 152.

In some embodiments, the system 100 manages changes to the data resulting from changes in the physical environment, time-series tags, and/or a wide range of other OT systems. Without a way to easily maintain an accurate model, it is very difficult for ML to learn over time or even to perform basic BI functions.

Data hubs are often deployed because companies want to connect to more of their own data and to others' data as well to enable their analytical algorithms and applications. In general, data hubs provide the ability to connect to any data source, move the data to a common repository for harmonization and contextualization, then share the data, and data models, with all data consumers. In some embodiments, the system 100 functions as a data hub addressing the asset data domain (e.g., assets, equipment, processes, and personnel), thereby enabling industrial companies to connect to data, manage their data models, digital representations of physical assets, and then share models and data across the enterprise.

In some embodiments, the system 100 ingests and manages raw time-series, metadata, transactional, and/or static data, then exports industrial enterprise data models in support of analytics and applications. In some embodiments, the system 100 extracts data from the raw time-series source data and other sources of context (e.g., SAP Plant Management (PM), Laboratory information Management Systems (LIMS), Product Information Management Systems (PIMS), custom applications, etc.) as it passes through the data chain and automatically classifies the data in certain ways according to a set of user-defined data transformation and blending rules. In some embodiments, the present system parses data tags according to various rules by identifying naming patterns for tag names (e.g., using regular expressions). The system may then break up the name into classes (e.g., substrings) each of which has a semantic meaning. Further data mapping may occur through the pipeline process, which may provide a visual programming language for defining transformations and joins on rectangular data (or "tabular" data) thus resulting an a wholly new dataset comprising data from a variety of source data systems.

In some embodiments, the system 100 uses a webhook based integration path, supporting management of change, collaboration, conversations and notifications. In some embodiments, the system 100 provides custom workflows based on event propagation.

In some embodiments, the system 100 can perform an Asset Sync process, whereby the system reacts to events and propagates the effects of those events along a data chain, thus making reactive updates to the industrial enterprise data model. The asynchronous communication of messages allows for highly resilient, distributed services which have no internal state, instead relying on an event-sourced architecture to manage event streams for every artifact in the system.

Data Modeling System Terminology

According to one embodiment, commands are directives which, when received, the receiver is required to respond to. Responding to the command may result in an error, but some response is expected. Responses to commands may also be associated with a timeout to deal with lost messages since the commands are responses are asynchronous. Some non-limiting examples of commands include: shutdown, createNewArtifact, stopProcessing, etc.

According to one embodiment, events are broadcast from a service to indicate that a relevant internal state of that service has changed and that any downstream systems or artifacts relying on that state should take appropriate action. Some non-limiting examples of events include, for example, newDataInDatasetXyz, templateAttbuteAdded, etc.

Abstractions involved in data propagation may include, without limitation, data chains, branches, artifacts, and an omniverse traffic cop. In some embodiments, data chains are the constructs that make up the complete, end-to-end flow of data and events through the system 100. In some embodiments, branches provide a mechanism for maintaining multiple data chains in a given enterprise. In some embodiments, artifacts provide the semantics for the components of a data chain. In some embodiments, the omniverse traffic copy controls the data chains, the branches, and the artifacts.

Data Chains

Figure 2:
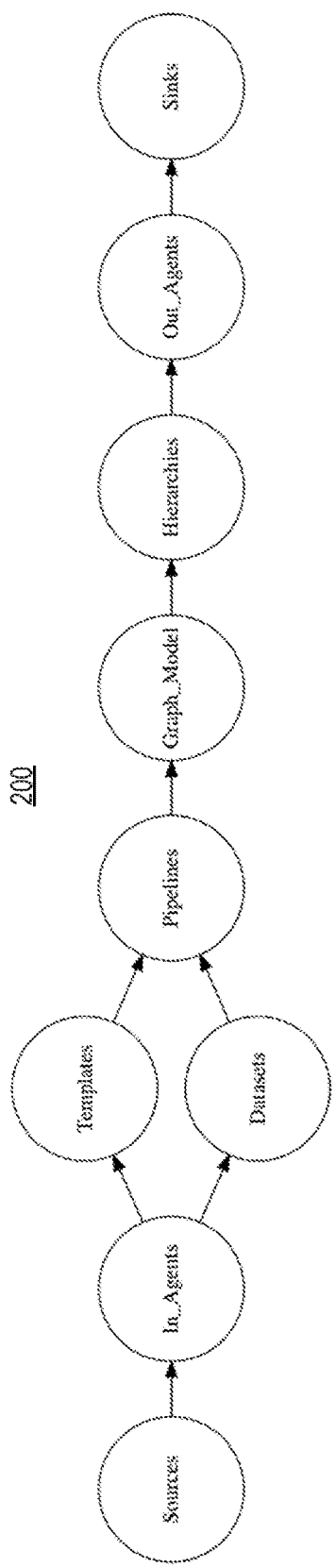
FIG. 2 is a diagram of a data chain, according to some embodiments.
Figure 3:
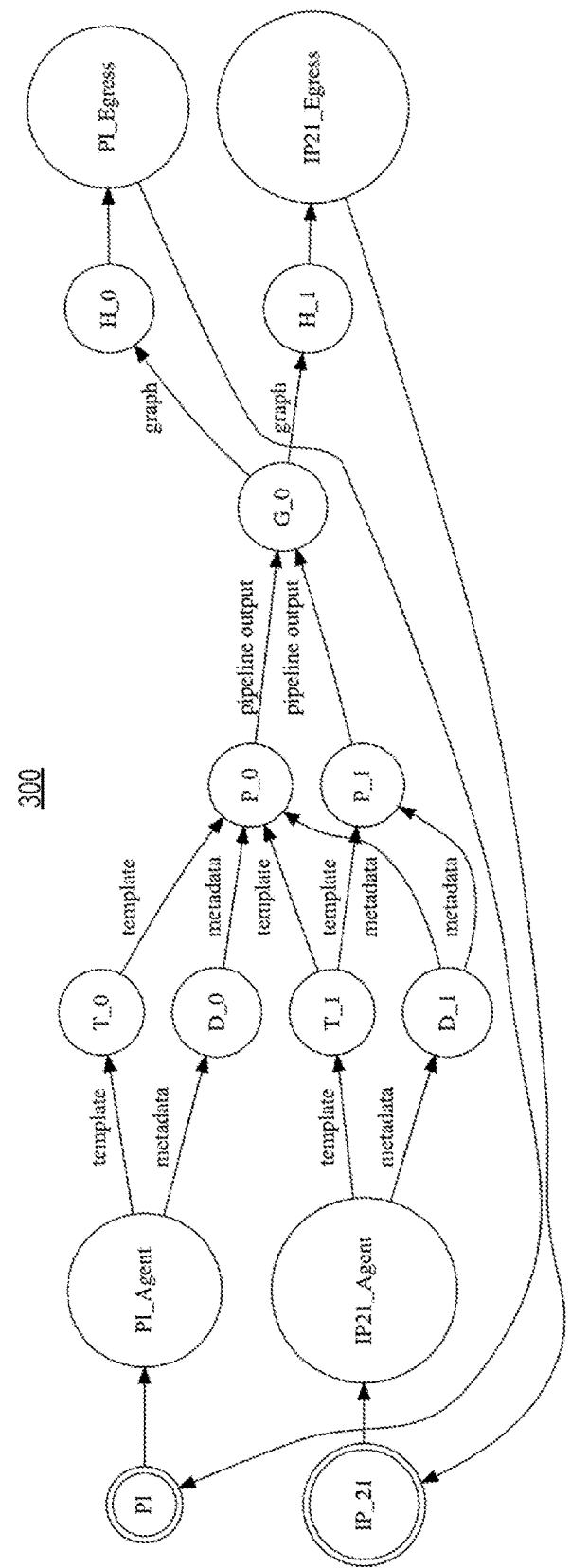
FIG. 3 is a diagram of an example of a data chain.

In some embodiments, a data chain represents an end to end flow of data from data sources to various destination systems (data sinks). One example of the general form of a data chain 200 is illustrated in FIG. 2. In the example of FIG. 2, any type of artifact referred to in the plural form may represent one or more instances of that type of artifact. A more complete example of a data chain 300 is shown in FIG. 3. In the example of FIG. 3, each node represented by a single ring (not a double ring) is an artifact. More particularly, in the example of FIG. 3, the data chain 300 has two ingress agent artifacts (PI_Agent and IP21_Agent), two asset model artifacts (T_0/D_0 and T_1/D_1) two data pipeline artifacts (P_0 and P_1), three relational artifacts (G_0, H_0, and H_1), and two egress agent artifacts (PI_Egress and IP21_Egress).

Life Cycle of a Data Chain

The life cycle of a data chain, which may be managed by an omniverse traffic copy, may include a replacement state, a merge state, and an event propagation state. These states are described in further detail below.

The replacement state of a data chain may be a precursor to data chain merging. The replacement state may allow the replacement of a single data chain with another single data chain. When the Dev chain replaces the Prod chain, the result is that the two chains are identical following the replacement. This replacement operation may be defined as:

$$F:(D,D) \to D \wedge F(d_{dev}, d_{prod}) = d_{dev} \wedge d_{prod} \leftarrow d_{dev}$$

A data chain may be placed in the merge state when the controller initiates a process by which two chains are merged into a single chain. During the merge process, the controller 150 may prompt the user to specify which changes to accept in cases where the controller is unable to automatically determine whether a change should be accepted or rejected. Once a merged chain is created, that resultant chain could be used to replace another one. For example, the chains Dev_Alice and Dev_Bob, could be merged to create a Dev Merged chain, which could then be used to replace the Staging chain. This merge and replace operation may be defined as:

$$F:(D,D) \to D \wedge F(d_{dev}, d_{prod}) = \\ d_{merged} \wedge d_{dev} \leftarrow d_{merged} \wedge d_{prod} \leftarrow d_{merged}$$

A chain can be either processing events or not processing events. When processing events, the chain may be in the event propagation state. In some embodiments, a data chain has the same contract as an artifact, and is, therefore, an artifact itself. When a data chain is not processing events, that implies that all artifacts contained within the data chain are also not processing events.

Branches

Figure 4:
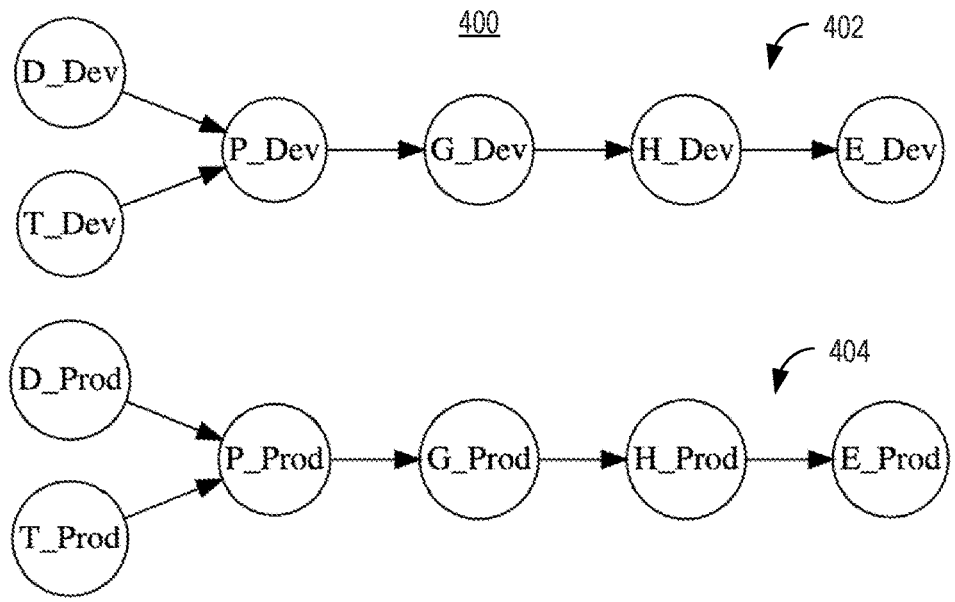
FIG. 4 is a diagram of another example of a data chain.

A branch refers to a version of a data chain. Within a given data chain, there may be multiple branches which describe various versions of that data chain. The different branches may be user configurable at the organization level; they may be, for example, Development, Staging, and Production. In some embodiments, these three branches are not intended to be different per data chain, but that may be useful for developing and staging a new or revise model prior to placing the new/revised model in production. FIG. 4 shows an example of a data chain 400 having two branches 402 (a Development branch) and 404 (a Production branch).

Artifacts

Each artifact may have a well-defined and identical life cycle. Every data chain may be represented as a directed graph of artifacts indicating event propagation between artifacts. The life cycle of an artifact, according to some embodiments, is described below.

Life Cycle of an Artifact

In some embodiments, each artifact has a two-dimensional life-cycle plus an empty state and a deleted state (in deterministic finite automata (DFA) language, those are START and END). In some embodiments, the first dimension ("processing" vs. "non-processing") determines whether or not those artifacts accept events for processing, and the second dimension ("published" vs. "draft") determines whether or not they send events. For example, an artifact in the "processing" state may accept incoming events for processing, whereas an artifact in the "non-processing" state may not accept incoming events for processing. Likewise, an artifact in the "published" state may send received events downstream, whereas an article in the "draft" state may not send received events downstream. In some embodiments, the artifact itself does not manage its own state transitions, though it may be responsible for receiving events from upstream and sending the resultant events downstream, in effect, the queueing process. In some embodiments, the queueing is managed by a higher level entity, the data chain.

Figure 5A:
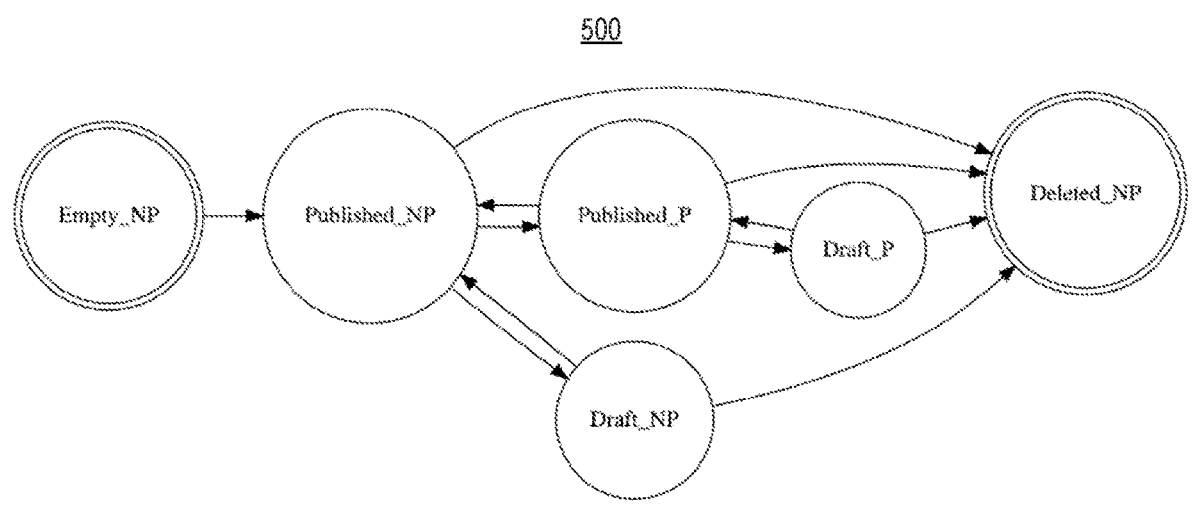
FIG. 5A is a state transition diagram of the life cycle of an artifact, according to some embodiments.

FIG. 5A shows a state transition diagram 500 of an artifact, according to some embodiments. In the example of FIG. 5A, there are six possible states for an artifact. Empty_NP (a START state, in which the artifact is not accepting events for processing), Published_NP (the artifact is able to send receive events downstream, but is currently not accepting events for processing), Published_P (the artifact is able to send received events downstream and is currently accepting received events for processing), Draft_NP (the artifact is not able to send received events downstream and is currently not accepting received events for processing), Draft_P (the artifact is not able to send received events downstream but is currently accepting received events for processing), and Deleted_NP (an END state, in which the artifact is not accepting events for processing). (In the example of FIG. 5A, the suffix NP indicates a state in which the artifact is not accepting received events for processing, and the suffix P indicates a state in which the artifact is accepting received events for processing.

In some embodiments, each artifact has a similar lifecycle to that of a data chain. For example, artifacts and data chains can either be processing events, by sending and receiving them, or not processing events. Whether or not an artifact (or data chain) is processing events may be controlled by the omniverse traffic cop. In some embodiments, artifacts (and data chains) can also be edited and saved. An edit takes a copy of the current artifact, then allows the user to make changes, and then uses a replacement strategy to replace the original with the edited copy.

Published vs Draft Artifacts

According to one embodiment, versions of artifacts, version control mechanisms, and the state transitions described above may be implemented as follows. Each artifact may have three state variables: ProcVer, MaxVer, and Deleted. The ProcVer state variable may identify the current "live" version of the artifact that is processing events. If the value of the ProcVer variable is "nil," no events are being processed by any version of the artifact. The MaxVer state variable may identify the version of the artifact displayed by the system, which may or may not be the version of the artifact that is processing events. The Deleted state variable indicates whether the artifact (including all of its versions) has been deleted.

Figure 5B:
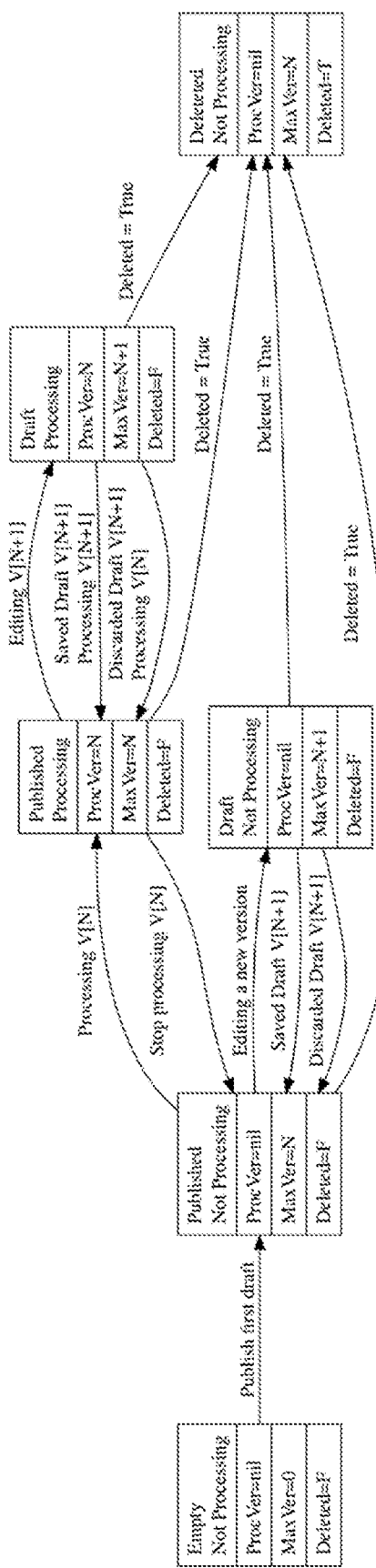
FIG. 5B is another state transition diagram of the life cycle of an artifact, according to some embodiments.

FIG. 5B shows a detailed state transition diagram 550 which is one possible implementation of the state transition diagram 500 of FIG. 5A. In the example of FIG. 5B, there are two transitions from the "draft" state to the corresponding "published" state (e.g., two transitions from Draft_NP to Published NP, and two transitions from Draft_P to Published_P. In each case, one such transition accompanies a discard operation (where the system permanently deletes the draft version of the artifact and keeps MaxVer at its current value of N) and such transition accompanies a save operation (where the system records the new version (N+1) of the artifact and sets MaxVer to N+1)

Artifact Service Contract

Artifacts (and the services that act as repositories for various classes) may have a simple set of operations to support the state machine above. These operations may be split into two categories: Commands and Events.

Artifact Service Commands

Artifact service commands may include Create, Read, Update, and Delete. The Create command may create a new artifact. The Read command may read an existing artifact, which may be identified, for example, by its ID (using MaxVer for version), or by its ID and a specific version number, or by a unique name, or by any other organizationally unique identifier. The Update command may update an existing artifact, either the latest version of the artifact as identified by the MaxVer state variable, or another version of the artifact specified by the user. Note that initiating an update may result in the creation of a new (draft) version if there's not already a draft version of the artifact. The details of the Update command may be service specific, and may depend on the data in that service (e.g., publishing and discarding a draft; turning processing on and off, etc.). The Delete command may transition the artifact to the deleted state.

Artifact Service Events

Any command that changes any relevant internal state of an artifact may trigger an event. Events may fall into two categories, events that describe changes to the artifact itself, and events that are caused by data propagating through a data chain. Some non-limiting examples of artifact service events may include Artifact Created (which may be triggered by completion of a Create command); Artifact Updated (which may be triggered by completion of an Update command); and Artifact Deleted (which may be triggered by completion of a Delete command). Cascading Events are those that are triggered by an upstream event, which may be in reaction to incoming source system data, or in reaction to upstream user initiated events (e.g., editing a pipeline).

Omniverse Traffic Cop (OTC)

In some embodiments, the OTC is a system that includes an event bus and an orchestration layer that controls how artifacts send and receive events via the underlying event bus. The OTC may manage whether a data chain is processing events, storing the data chain definitions, or managing branches of data chains.

To support incremental rollout of data models, the OTC may propagate events to services that don't follow the artifact contract. Those events may be translated to HTTP calls. As part of this process, the system may either construct a shim at the service level to translate the event messages to HTTP calls, or the OTC may directly translate the event messages to HTTP calls.

OC Contract

In some embodiments, the OTC maintains the data chain artifacts. As such, it may expose the artifact service API as described above for the data chain artifacts.

Data Chain Service Commands

Some non-limiting examples of data chain service commands may include Create, Read, Update, and Delete. The Create command may create a new data chain. Initially, the created data chain can either be empty or can be a copy of another data chain. The Read command may read an existing data chain, which may be identified by one or more parameters of the command (e.g., a parameter identifying the data chain's ID, a parameter identifying a version of the data chain, etc.). If the version parameter is omitted, use the version of the data chain indicated by its MaxVer state variable may be selected. The Update command may update an existing data chain. In some embodiments, data chains are immutable and, therefore, all Update operations to a data chain result in the creation of a new version of the data chain. Some non-limiting examples of updates to data chains may include editing a data chain (e.g., by adding new relationship edges or artifact nodes); promoting a data chain to another data chain; changing the processing state (processing events vs. not processing events); etc. In some embodiments, edits to a data chain are isolated to the data chain artifact itself and, therefore, do not cascade through the data chain's child artifacts. In some embodiments, promoting a data chain or changing a data chain's processing state cascades through the data chain's child artifacts. The Delete command may transition the data chain to the deleted state. In some embodiments, deleting a data chain cascades to the data chain's child artifacts such that all of them are also deleted.

Computer-Based Implementations

Figure 6:
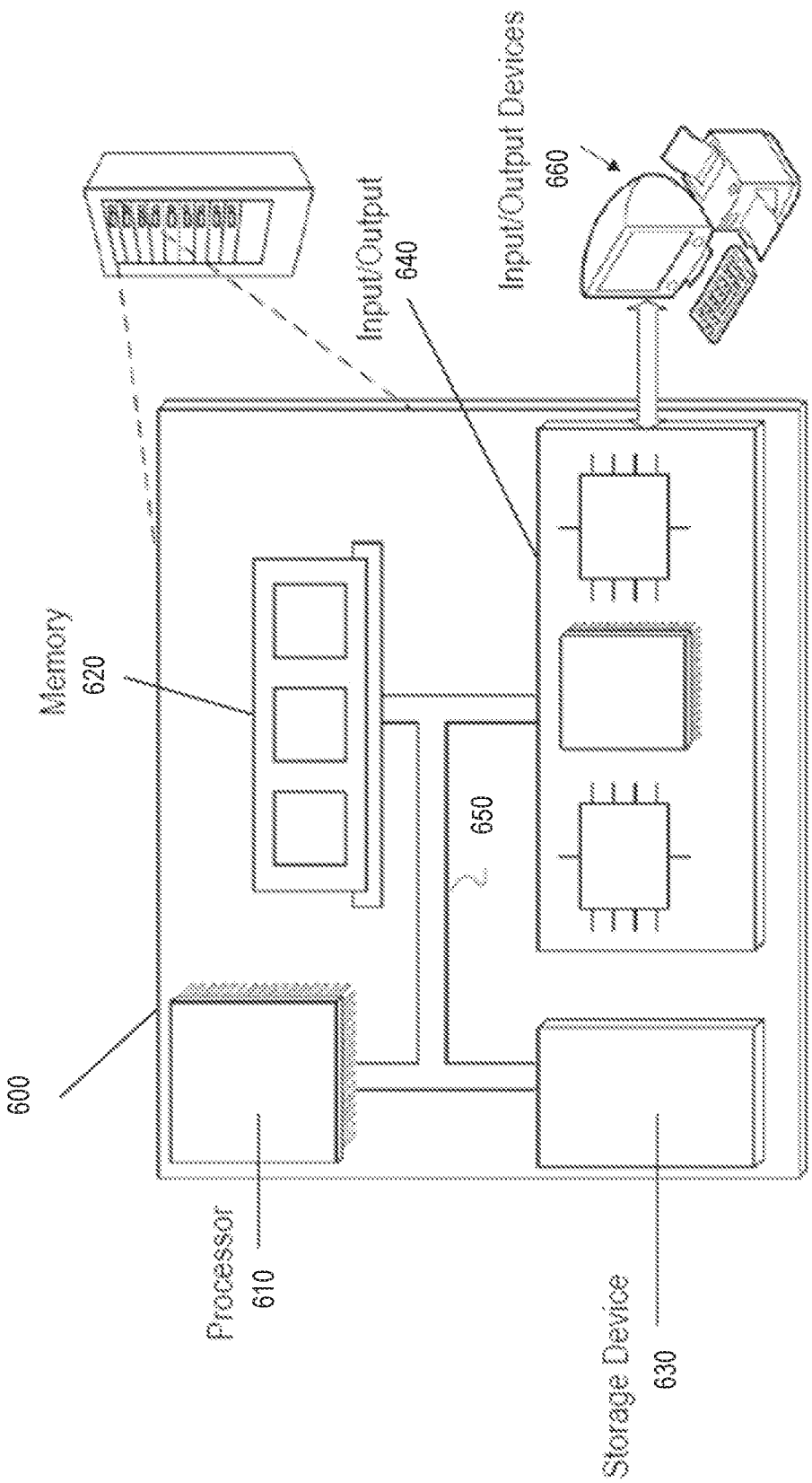
FIG. 6 is a block diagram of an example computer system.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a wireless modem (e.g., 3G, 4G, or 5G). In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, for example as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, and wireless connections.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for managing industrial enterprise data models, the system comprising:
    a storage device with industrial enterprise data models stored therein, wherein the industrial enterprise data models represent one or more industrial assets and are configured to (i) obtain data from one or more data sources storing data related to the one or more industrial assets and (ii) provide contextualized data to one or more data sinks, and wherein each of the industrial enterprise data models comprises:
        references to one or more artifacts, wherein the one or more artifacts form sub-modules within the industrial enterprise data model, the one or more artifacts configured to process events; and
        a directed graph having a plurality of nodes and a plurality of edges, wherein each of the nodes representing a respective one of the artifacts and each of the edges indicating a relationship between a respective pair of the artifacts; and
    a modeling controller communicatively coupled to the storage device, the modeling controller operable to:
        manage a data flow through a particular one of the industrial enterprise data models so that the edges of the directed graph of the particular industrial enterprise data model define a direction of propagation of data through the artifacts within the particular industrial enterprise data model; and
        provide a version control functionality for the industrial enterprise data models and for the artifacts referenced by any of the industrial enterprise data models.

2. The system of claim 1, wherein the industrial enterprise data models are event-driven, and wherein the edges of the directed graph of the particular industrial enterprise data model further define a direction of propagation of events through the artifacts of the particular industrial enterprise data model.

3. The system of claim 2, wherein the modeling controller is further operable to manage respective states of the artifacts of the particular industrial enterprise data model in response to processing of one or more events by the artifacts of the particular industrial enterprise data model.

4. The system of claim 1, wherein the particular industrial enterprise data model represents one industrial asset from the one or more industrial assets.

5. The system of claim 4, wherein the one industrial asset comprises a pump, a tank, a heat exchanger, or a compressor.

6. The system of claim 4, wherein the particular industrial enterprise data model is configured to ingest at least one time-series stream of operational data comprising a plurality of data packets, each of the data packets having a timestamp and a measurement of an operational parameter of the one industrial asset at a time corresponding to the timestamp.

7. The system of claim 6, wherein the particular industrial enterprise data model is further configured to ingest contextual data relating to the one industrial asset.

8. The system of claim 7, wherein the contextual data include design data relating to a design of the one industrial asset, location data relating to a location of the one industrial asset, and/or maintenance data relating to a maintenance history of the one industrial asset.

9. The system of claim 1, wherein the artifacts of the particular industrial enterprise data model include two or more other data models.

10. The system of claim 1, wherein the artifacts of the particular industrial enterprise data model comprise one or more (1) ingest agent artifacts, (2) processing pipeline artifacts, (3) asset model artifacts, (4) dataset artifacts, (5) graph artifacts, and/or (6) egress agents artifact.

11. The system of claim 10, wherein a particular one of the ingest agent artifacts is operable to ingest data from the one or more data sources and provide the ingested data to a processing pipeline artifact.

12. The system of claim 10, wherein a particular one of the asset model artifacts represents a corresponding type of industrial asset and organizes data relating to the corresponding type of industrial asset in accordance with a respective template.

13. The system of claim 10, wherein a particular one of the graph artifacts represents relationships between one or more of the other artifacts of the particular industrial enterprise data model.

14. The system of claim 10, wherein a particular one of the egress agent artifacts is operable to provide the contextualized data from the particular industrial enterprise data model to the one or more data sinks.

15. The system of claim 1, wherein the one or more industrial assets are assets in an asset-intensive facility.

16. The system of claim 1, wherein the one or more data sources contain operational data from the one or more industrial assets, the operational data comprising operation data, design data, maintenance data, transactional data, static data, and/or information technology (IT) data related to the one or more industrial assets.

17. The system of claim 1, wherein the one or more data sinks are external to the storage device and the modeling controller, and comprise one or more artificial intelligence (AI) systems and machine learning (ML) systems configured to analyze the contextualized data.

18. A method for managing industrial enterprise data models, the method comprising:
  storing, on one or more storage devices, industrial enterprise data models, wherein the industrial enterprise data models represent one or more industrial assets and are configured to (i) obtain data from one or more data sources storing data related to the one or more industrial assets and (ii) provide data to one or more data sinks, and wherein each of the industrial enterprise data models comprises;
    references to one or more artifacts, wherein the one or more artifacts form sub-modules within the industrial enterprise data model, the one or more artifacts configured to process events; and
    a directed graph having a plurality of nodes and a plurality of edges, wherein each of the nodes representing a respective one of the artifacts and each of the edges indicating a relationship between a respective pair of the artifacts; and
  managing, with a modeling controller communicatively coupled to the one or more storage devices, a data flow through a particular one of the industrial enterprise data models-so that the edges of the directed graph of the particular industrial enterprise data model define a direction of propagation of data and events through the artifacts within the particular industrial enterprise data model; and
  providing, with the modeling controller, a version control functionality for the industrial enterprise data models and for the artifacts referenced by any of the industrial enterprise data models.

* * * * *